United States Patent Office 3,517,815
Patented June 30, 1970

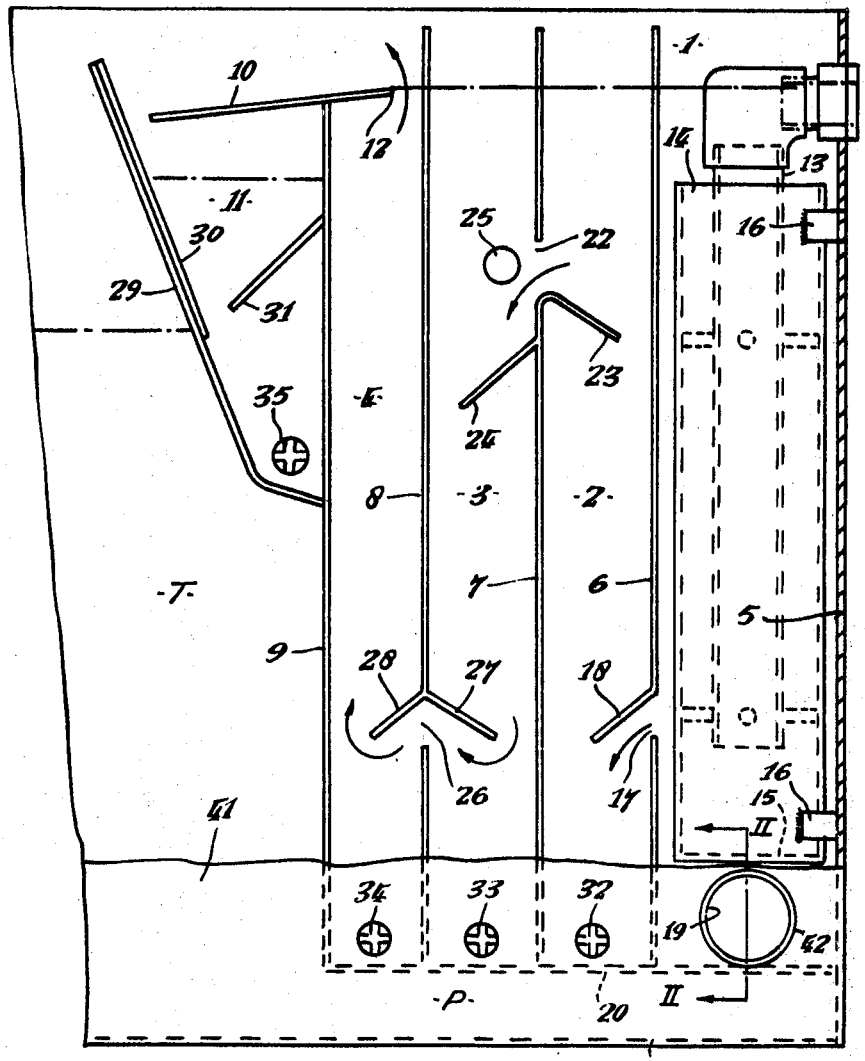
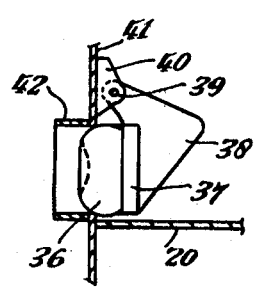
Fig.1.
Fig.2.

3,517,815
REPLENISHMENT TANKS
Robert Benjamin Bolton, Ponteland, Northumberland, and Thomas Gray, Castleside, Consett, England, assignors to R. B. Bolton (Mining Engineers) Limited, Consett, England, a company of Great Britain and Northern Ireland
Filed July 15, 1968, Ser. No. 744,970
Claims priority, application Great Britain, July 19, 1967, 33,211/67
Int. Cl. B01d 21/24
U.S. Cl. 210—256  10 Claims

ABSTRACT OF THE DISCLOSURE

A replenishment tank for instance for hydraulic power power systems, has a reservoir for cleaned liquid and an entry portion between the inlet and the reservoir. The entry portion comprises a plurality of compartments through which the incoming contaminated liquid has to pass successively. The aperture in the or each partition between the compartments is arranged so that the fluid has to follow a tortuous path through the entry portion thus giving the contaminants time to settle or rise to the surface according to their density. At least one, and preferably all, the apertures are below the surface of the liquid in the compartments and above the floor of the compartments; thus forming in each compartment a settling chamber below the apertures and a flotation chamber above the apertures in which the contaminants may collect. The liquid is received into the entry portion from the inlet with small turbulence over a submerged weir, and it is discharged from the entry portion to the reservoir over an exposed weir.

BACKGROUND OF THE INVENTION

Figure 3:
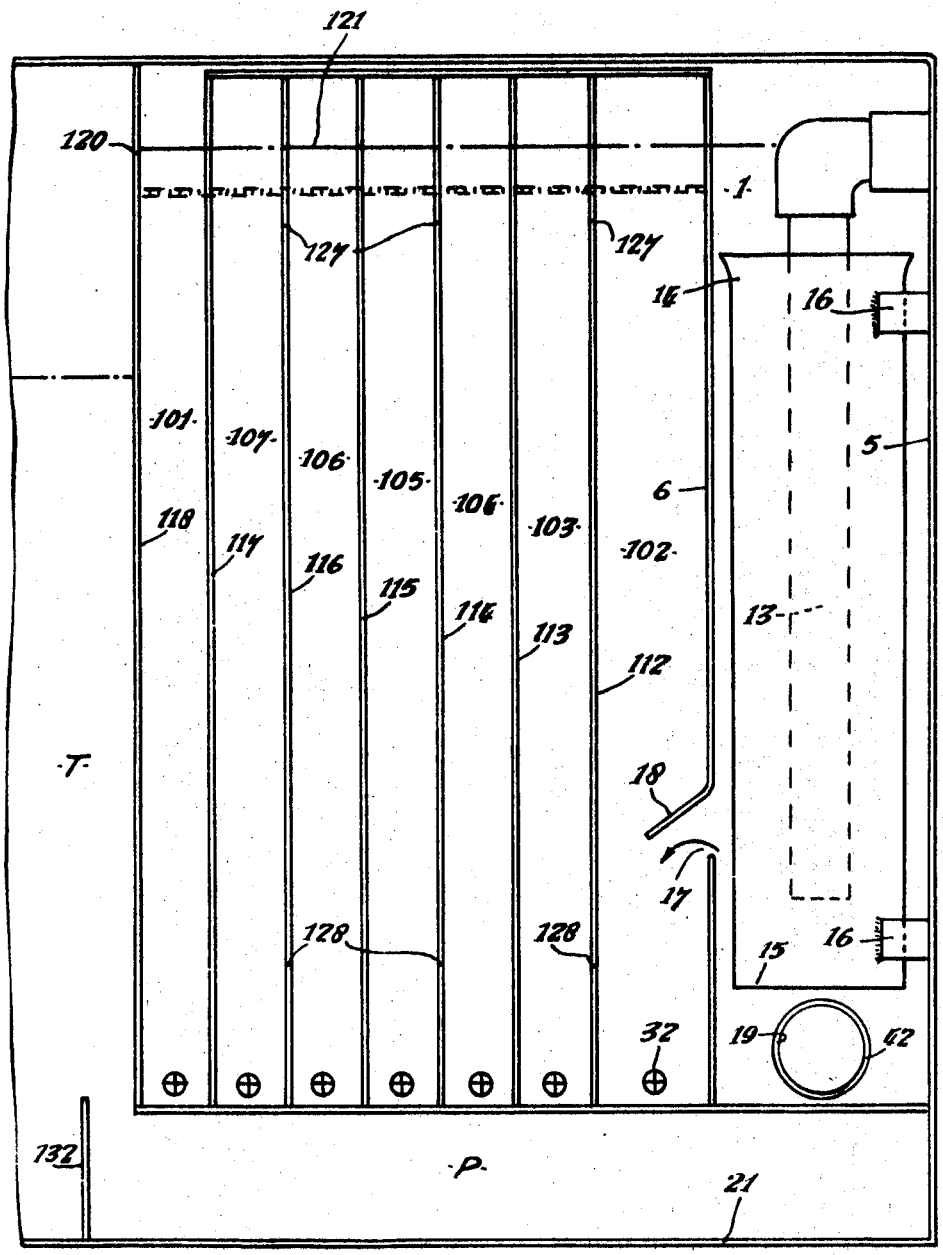
Figure 6:
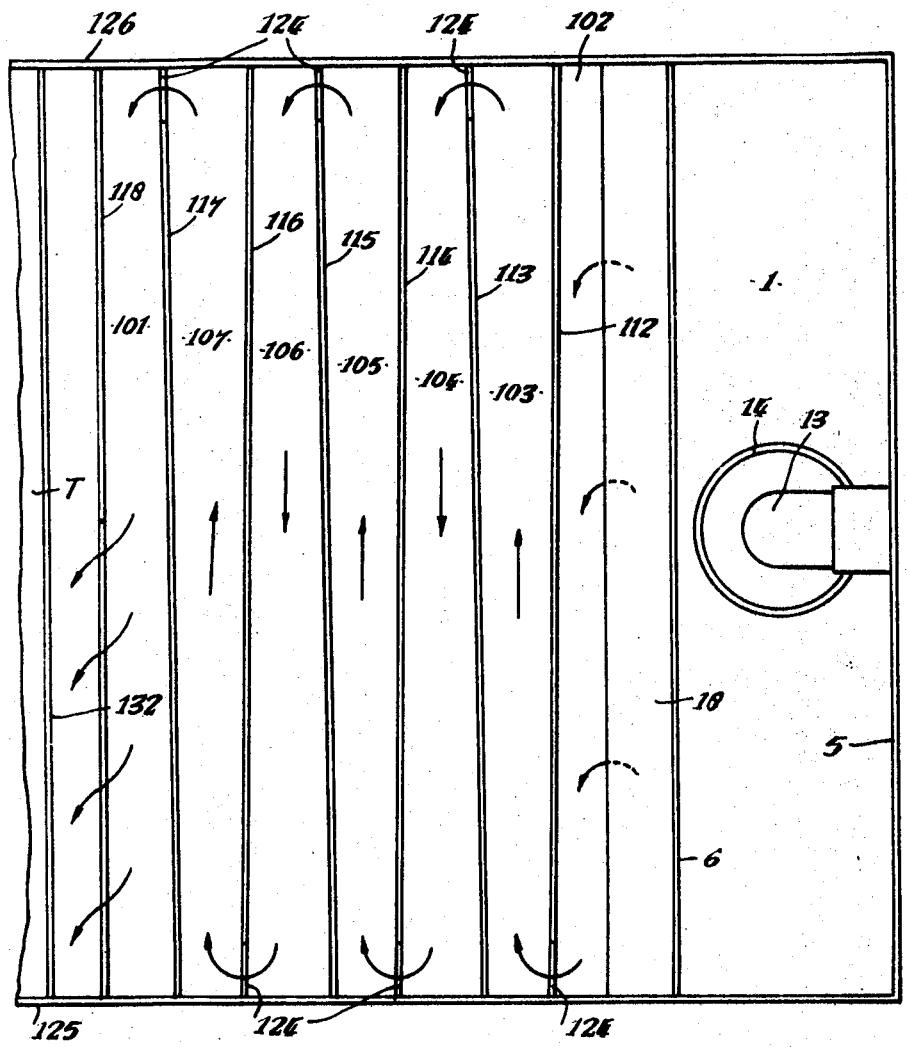

This invention relates to replenishment tanks particularly, but not exclusively, for hydraulic power systems.

A hydraulic power system, such as a system of props, rams and other hydraulic motive units as used in underground coal mining, usually employs as a motive liquid water containing a soluble oil. There are inevitably some losses of the liquid through safety valves, leakage and occasional discharge to waste. The liquid is therefore returned to the circulating pump by way of a replenishment tank, wherein further water and soluble oil are added.

The returning liquid is usually contaminated with lubricating oil and an oily scum. In a mining system, the liquid also contains dirt from hose couplings, plugs and other items of the equipment which have been dropped on the floor or left exposed. Accordingly, some attempt is made to design the replenishment tank with separation and flotation compartments to remove the oil, scum and dirt. The means provided for this purpose in replenishment tanks as hitherto known are not satisfactory, and further entail unacceptably stringent requirements for the occasional cleansing of the compartments wherein the contaminants collect.

It is impossible to rely solely on any kind of static permeable filter for the contaminated liquid since such a filter rapidly becomes choked with oil-impregnated solid matter.

It is known in such a tank to cause the returning liquid to pass over a weir adjacent which is horizontally located a rod-form permanent magnet to gather particles of metal from the liquid.

It is also known to separate insoluble oil or grease from water or other liquid by passing the contaminated liquid through a tank in a tortuous path produced by a series of baffles, alternately upstanding from the floor of the tank and terminating below the level of the liquid and downwardly depending into the liquid and terminating short of the floor of the tank. This increases the flow path of the liquid and thereby gives an increased opportunity for the contaminants to separate. This method is inefficient however since in the region where the liquid passes around an upstanding baffle there is a condition of maximum turbulence which tends to entrain the contaminants and prevent their separation. The same consideration would apply with respect to any dense contaminants which it is desired should settle on the floor of the tank.

It is an object of the present invention to provide improved means for separating contaminants from liquid by providing a minimum of turbulence in the liquid in those regions of the tank where it is desired that the contaminants should collect.

SUMMARY OF THE INVENTION

A replenishment tank has a reservoir for cleaned liquid, an outlet from the reservoir, a liquid inlet to the tank, and an entry portion located between the inlet and the reservoir, said entry portion having a first compartment arranged to receive the liquid from the inlet with small turbulence over a submerged internal weir and to discharge the liquid through an aperture, and a second compartment arranged to receive the liquid through an aperture and to discharge it over an exposed weir to the reservoir, the or at least one said aperture having its lower edge spaced from the floor of the compartment so as to provide a settling chamber for contaminants denser than the liquid and its upper edge below the surface of the liquid so as to provide a flotation chamber for contaminants less dense than the liquid, the said aperture or apertures further being arranged so that the liquid in passing from said submerged weir to said exposed weir must follow a tortuous path.

Preferably the aperture from the first compartment has its lower and upper edges spaced from the floor of the compartment and below the surface of the liquid respectively.

Preferably one or more intermediate compartments are provided between said first and second compartments, each intermediate compartment communicating with the adjacent compartments through apertures as aforesaid. Preferably also each compartment is provided with a purging or draining fitment at its lower end.

Any of said apertures may be provided with one or more obliquely depending sills to assist in separating the contaminants from the liquid as the liquid passes from one compartment to the next.

The exposed weir may be an apron plate, preferably inclined at a shallow angle towards the reservoir to afford the zone for inspection of the liquid. A filter trough or compartment may be provided on the downstream side of the exposed weir to filter the liquid before passing through the reservoir.

The submerged weir in said first compartment may be afforded by the rim of a deep bucket or pot having an entry pipe for the liquid led down its middle and terminating short of its lower end. Said bucket or pot may for example be a section of tubing, having its lower end closed, and having a diameter somewhat less than the longitudinal dimension of said first compartment, the entry pipe being located concentrically therein.

In the operating conditions of a replenishment tank which are generally dirty, at least in mining, it is desirable to provide means for draining at least said first compartment which does not require the use of tools or small securing elements such as set bolts or studs and nuts. The invention may also provide for such a compartment, wherein it is intended to collect a large proportion of sedimentary contaminant from a fluid, a closure device for a drain orifice which consists of a pivotally dependent, weighted obturator formed to have line contact with the internal periphery of the orifice, and adapted to be displaced, for opening the orifice, simply by being pushed with a rod from the exterior of the orifice.

Figure 5:
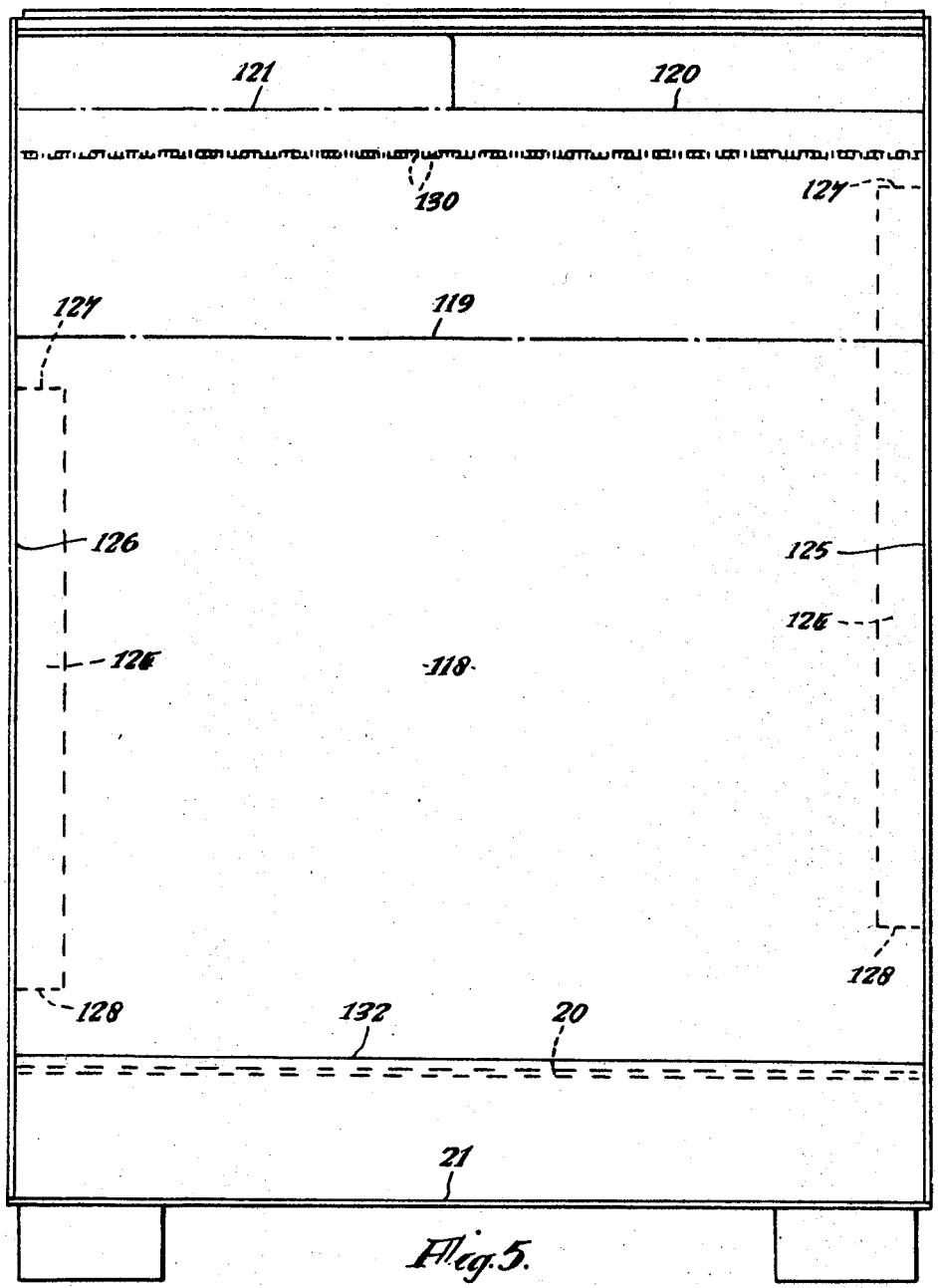

The foregoing and other features of the invention will be better understood from the following description of the construction and mode of operation, given solely by way of example, of two embodiments, with reference to the accompanying drawings, wherein:

FIG. 1 is a fragmentary longitudinal section of an entry portion of a first replenishment tank, and FIG. 2 is a detail, partly in elevation and partly in section on the line II—II of FIG. 1 of a closure device, FIG. 3 is a longitudinal side view, with the side wall removed, of an entry portion of a second embodiment of replenishment tank, FIG. 4 is a plan view of FIG. 3, and FIG. 5 is a cross-sectional view through the tank at X—X looking toward the entry portion.

A replenishment tank, of which the structure shown in FIG. 1 forms an entry portion, comprises a clean liquid reservoir tank T, and a tank for soluble oil (not shown), a mixing valve for entry of clean, make-up water which entrains the soluble oil through an infuser pipe being controlled by a float which determines the upper level of liquid in the reservoir.

The entry portion comprises four compartments, a first compartment 1, a second compartment 4, and two intermediate compartments 2 and 3, defined by an end or transverse wall 5 of the tank and four transverse vertical partitions 6, 7, 8 and 9. At the top of the partition 9 there is an apron plate 10 providing an exposed weir over which the liquid flows to a filter trough 11. The plate 10 is slightly inclined downwards into the trough and its upper edge 12 determines the level of liquid in the compartments 1–4, since each of the partitions 6, 7 and 8 extends to a height above said edge 12.

An entry pipe 13 for the contaminated liquid returning from the motive units extends vertically downwards concentrically within a section of tubing 14, with its lower end 15 blanked off, to constitute a bucket which is secured within the chamber 1 to the tank wall 5 by lugs 16. The rim of the tubing 14 provides a submerged weir for the incoming liquid. In the lower part of the partition 6 there is a transversely extending aperture 17, the upper margin of which has an oblique outwardly extending sill 18. At the bottom of the compartment 1 a draining orifice 19 is provided in one side wall of the tank.

In the arrangement shown, the floors of the several compartments 1–4 are constituted by a single, transversely extending, horizontal plate 20, which is spaced above the bottom of the tank 21, and provides an outlet passage P to a suction branch from the reservoir T.

In the upper part of the partition 7 there is a transversely extending aperture 22 for the passage of liquid from the compartment 2 into the compartment 3. The lower margin of said aperture has a sill 23 extending backwards (relative to the direction of fluid flow) and downwards across the greater part of the compartment 2, and another obliquely and downwardly extending sill 24 extending across the greater part of the compartment 3. Adjacent the aperture 22 there is located across the compartment 3 a permanent magnet 25 of rod-form. Since this magnet is long and can be mounted only by one end in one of the side walls of the tank, in order to prevent it from attracting itself to one or other of the margins of the aperture 22, the free end of the magnet may be guided, with the aid of a non-magnetic element secured thereto, upon rods (not shown) which extend across the tank.

In the lower part of the partition 8 there is a transversely extending aperture 26 through which liquid may pass from the compartment 3 to the compartment 4. On the upper margin of said aperture there are secured a sill 27 extending backwards and downwards across the major part of the compartment 3 and a sill 28 extending forwards and downwards across the major part of the compartment 4.

The filter trough 11 is formed by an oblique wall 29 which extends upwardly from about the middle of the partition 9. Upon the inner surface of the wall 29 a permeable filter 30 in the form of a transversely extending strip of woven wire mesh is secured over an aperture in said wall 29. Further, within the trough 11, and below the apron plate 10, there is secured to the partition 9 an oblique sill 31 extending downwards towards the lower end of the filter strip 30 across the greater part of the width of the trough 11 at this zone.

Each of the compartments 2, 3 and 4, and the trough 11, has at its lower end, in one side wall of the tank, a drain orifice, these being closed by screwed plugs 32, 33, 34 and 35.

The purpose of the arrangement, described by way of example, is to trap the greater part of any sediment contained in the returning, contaminated liquid in the compartment 1, and to trap oil and floating scum in the upper parts of the compartments 1–4, and beneath the oblique sills 23, 24, 27 and 28 so, that by the time the liquid flows over the apron plate 10, where it can be inspected from the top of the tank, it has been substantially cleaned, and thus freed from all or nearly all of the contaminating materials which might tend to clog the filter 30.

The arrangement of the transverse apertures 17, 22 and 26 is to promote relatively slow and streamlined flow of the liquid, with a minimum of turbulence. Further the arrangement of the entry pipe 13 within the concentric tube 14 has for an object to promote nonturbulent entry of the liquid into the compartment 1.

For example, let it be assumed that the liquid is returned through the pipe 13 at a rate of 20 gallons per minute, equal to about 90 cubic inches per second. The rate of flow of this liquid in the pipe 13 is about 40 inches per second, while the rate of flow over the rim of the pipe 14 is reduced to about 6.5 inches per second. From said upper edge the liquid falls very slowly in the compartment 1, which has a transverse dimension of 26″. Thus the rate of flow through the aperture 17 is about 3.5 inches per second. Any floating contaminant such as oil or scum which separates during the slow passage of the fluid beneath the sill 18 is diverted back into the compartment 1 wherein it can float towards the top of said compartment. The liquid again rises slowly in the compartment 2, when remaining sediment may settle to the bottom of said compartment, and floating contaminants which are not trapped beneath the sill 23 may rise towards the top of the compartment. The liquid then passes through the aperture 22 and over the magnet 25 at a similar slow rate, and descends slowly in the said compartment 3 so that further sediment may settle to the bottom of said compartment and oily matter, which is not trapped beneath the sill 24, may rise to the surface of the liquid therein. Again, the liquid passes slowly through the deeply submerged aperture 26 into the compartment 4, wherein it rises slowly to the upper edge 12 of the apron plate 10, and in said compartment 4 further sediment may settle to the bottom, while virtually the whole of any residual oily matter is trapped beneath the sills 27 and 28. By the time the liquid reaches its upper level in the compartment 4, as determined by the edge 12 of plate 10, it is practically cleaned, and therefore does not tend to clog the filter strip 30, which may be made of twill woven 100 mesh wire of 40 SWG, affording very small apertures. The filter strip is washed by the entering liquid in a direction which causes any remaining sediment to settle in the bottom of the trough 11, and any remaining oily matter to be trapped either beneath the downwardly extending portion of the plate 10, or beneath the oblique plate 31.

The compartment 1 may be completely drained, the compartment 2 may be emptied down to the level of the lower edge of the aperture 17, and the compartment 3 emptied down to the level of the lower edge of the aperture 22, simply by opening the drain orifice 19. This will remove the greater part of the sediment which is collected in the compartment 1, together with oily matter floating in said compartments and collected under the sill 23. The lower part of the compartment 2 may be drained by removing the plug 32. The compartment 3, below the level of the aperture 22, together with the compartment 4 down to the level of the aperture 26, together with any oily matter collected beneath the sills 24, 27 and 28 may be drained and flushed out by removing the plug 33. The lower part of compartment 4 may be drained by removing the plug 34, while the trough 11, together with oily matter trapped beneath plates 10 and 31 may be drained and flushed out by removing the plug 35.

Since flushing out of much the greater part of the collected sediment and oily matter is achieved by opening of the orifice 19, it is desirable to make such operation as simple as possible. Hitherto it has been customary to close the requisite large orifice by a plate and gasket which are secured by set screws or studs and nuts, which in a mining environment are difficult to remove and replace, and may easily be dropped upon dirty ground, and lost.

According to a further feature of the invention there is provided for the orifice 19, as shown in FIG. 2, a captive obturator, that can be opened simply by pushing it with a rod. A half-spherical member 36 is bonded by its diametrical base to a flat plate 37 which in turn is secured to an arm 38 pivotally suspended on a pin 39 between lugs 40 secured to the inner surface of the tank side wall 41. The form of the arm 38 is such that under gravity the member 36 is urged into line contact with the inner periphery of the orifice 19, and the sealing is reinforced by the head of liquid bearing upon the plate 37. This plate may be larger than the member 36, so that when the obturator is pushed inwards and upwards it gouges out a channel in the accumulated sediment to provide free passage for the member 36.

The sediment is flushed out by the weight of the liquid in the compartment 1 and the upper parts of compartments 2 and 3, and this liquid also entrains oil and scum that may be floating in these three compartments.

Since it is required less frequently to drain the lower parts of compartments 2 and 3, the compartment 4 and the trough 11, these may be provided with relatively small screwed plugs 32–35, adapted to be operable by a simple tool or bar.

The obturator member 36 may be protected externally from damage or accidental operation by a spigot 42, which may be screw-threaded to receive a screwed cap or plug.

In the second embodiment, shown in FIGS. 3, 4 and 5, the tank has a reservoir T for cleaned liquid and an entry portion comprising eight compartments; a first compartment 1, a second compartment 101 and six intermediate compartments 102, 103, 104, 105, 106, and 107. The compartments extend transversely across the tank and are defined by an end or transverse wall 5 of the tank and eight transverse vertical partitions 6 and 112–118. Each of the partitions 6, 112–118 extends above the level 119 of the liquid in the reservoir T, and the last partition 118 is stepped downwardly across about half its width so as to provide an exposed weir 120 which determines the level 121 of liquid in the entry portion.

The first compartment 1 is substantially identical to that of the first embodiment (FIG. 1) and the same numbering is used for like parts. The intermediate compartments 102–107, however, communicate with each other through the vertically elongate apertures 124 provided in the partitions 112–117 adjacent the side walls 125 and 126 of the tank. The apertures 124 are provided in alternate partitions (112, 114 and 116) adjacent side wall 125 and in the other partitions (113, 115 and 117) adjacent side wall 126. Thus the liquid can only pass from the first compartment 1 to the second compartment 101 by following a tortuous (in this case zig-zag) path through the intermediate compartments. The apertures 124 all have their upper edges 127 below the surface 121 of the liquid and their lower edges 128 spaced above the floor 20 of the compartments. Thus each compartment is provided with a settling chamber below the level of the apertures and a flotation chamber above the level of the aperture. All the apertures 124 are of substantially the same size and shape and located at the same level except for that in partition 117. This aperture is located at a somewhat lower (as shown in FIG. 5 adjacent to side wall 126). This increases the flow path through compartment 101 from the aperture to the weir 129 provided in the remote side (adjacent side wall 125) of partition 118. It is for this same reason that the weir 120 does not extend completely across the width of the partition 118. The lower level of the aperture in partition 117 further has the effect of imparting a downward flow in compartment 107 and of increasing the size of the flotation chamber in that compartment thereby reducing the chance of floating contaminants being carried over the weir.

The possibility of floating contaminants being carried over from one compartment to the next is further reduced by locating a removable perforate baffle 130 across each compartment below the level 121 of the liquid but above the upper edges 127 of the apertures 124. These baffles (the position of which is shown in FIG. 3 and 5, but not FIG. 4) may be in the form of metal plates with punched holes.

It will be seen that the tortuous path followed by the liquid through the intermediate compartments in this embodiment is in a generally horizontal plane whereas in the first embodiment it was in a generally vertical plane. This has one advantage in that the length of the path can be increased by increasing the width of the compartments rather than their depth. The generally horizontal path followed by the liquid further facilitates separation of the floating contaminants from the sedimentary contaminants. In the first embodiment there was a tendency for the floating contaminants to be swept down and entrained in the downwardly moving stream of liquid, and for sedimentary contaminants to be swept up and entrained in the upwardly moving flow of liquid.

The length of the path followed by the liquid can be further increased by increasing the number of intermediate compartments.

The outlet 17 from the first compartment is shown in both embodiments as being horizontally elongate and having an oblique sill 18. It would however, be possible to employ a vertically elongate aperture as in the other partitions, but in that case it may be preferable to employ a different design for the submerged weir in the first compartment so as to reduce the amount of contaminants carried into the next compartment. With the present design about 95% of solid contaminants in a soluble oil/water hydraulic mixture are separated in the first compartment.

Even with the very long path provided in the second embodiment a minute amount of floating and sedimentary contaminants is carried through to the reservoir T. Owing to the relatively long standing period of the liquid in the reservoir most of this residual contaminant has time to separate. The floating contaminant is not so important since the liquid is drawn off from the bottom of the tank, but to entrap the sedimentary contaminant an upstanding baffle plate 132 is provided on the bottom 21 of the tank near entrance to the outlet passage P.

It will be evident that numerous further embodiments of the invention or modifications of the present embodiments will be possible within the scope of the following claims.

We claim:
1. A replenishment tank having a reservoir for cleaned liquid, an outlet from the reservoir, a liquid inlet to the tank, and an entry portion located between the inlet and the reservoir, said entry portion having a first compartment arranged to receive the liquid from the inlet over a submerged internal weir and to discharge the liquid through an aperture to a plurality of intermediate compartments formed by spaced partitions, a second compartment arranged to receive the liquid through an aperture from said intermediate compartments and to discharge it over an exposed weir to the reservoir, said aperture discharging to said intermediate compartments having its lower edge spaced from the floor of the compartment so as to provide a settling chamber for contaminants denser than the liquid and its upper edge below the surface of the liquid so as to provide a flotation chamber for contaminants less dense than the liquid, the said apertures being further arranged so that the liquid in passing from said submerged weir to said exposed weir must follow a tortuous path, passage for the liquid through the intermediate compartments being provided by vertically elongate apertures located on alternately opposite side edge portions of the partitions separating the intermediate compartments such that the liquid in passing through the intermediate compartments must follow a horizontally zig-zag tortuous path, at least said first compartment being provided at its lower end with a purging and draining fitment comprising an outlet orifice and a pivotally dependent weighted obturator formed to have line contact with the internal periphery of the orifice and adapted to be displaced from said contact, for opening the orifice, by being pushed from the exterior of the orifice, and said submerged weir in the first compartment comprises a section of tubing, vertically disposed and closed at its lower end, having an entry pipe for the liquid located generally concentrically therein and terminating short of its lower end.

2. In a replenishment tank system having a reservoir for cleaned liquid, an entry portion for liquid cleaning purposes which comprises a first compartment and a second compartment, an exposed weir in the second compartment over which the liquid discharges for supply to the reservoir, an upright bucket or pot in the first compartment having its rim at a lower level than the exposed weir in the second compartment and thus forming a submerged weir in the first compartment, an inlet pipe leading downwardly into the bucket or pot and terminating below the rim thereof, and intermediately between the first and second compartments, at least one partition with a submerged aperture to provide an extended flow path for the liquid between the submerged weir and the exposed weir, said aperture having its lower edge spaced above the floors of the adjoining compartments so as to provide at the bottom of each compartment a settling chamber for contaminants denser than the liquid and its upper edge spaced below the level of said exposed weir so as to provide at the top of the adjacent compartment on the side lying in the direction of the submerged weir a flotation chamber for contaminants less dense than the liquid.

3. In a replenishment tank system an entry portion according to claim 2 wherein said submerged weir in the first compartment is provided by the entire upper edge of a section of tubing, vertically disposed and closed at its lower end, having an entry pipe for the liquid located concentrically therein and terminating short of its lower end.

4. In a replenishment tank system having a reservoir for cleaned liquid, an entry portion for liquid cleaning purposes which comprises a number of compartments through which the liquid flows in succession, namely a first compartment, a second compartment and at least one intermediate compartment, an exposed weir in the second compartment over which the liquid discharges for supply to the reservoir, an upright bucket or pot in the first compartment having its rim at a lower level than the exposed weir in the second compartment and thus forming a submerged weir in the first compartment, an inlet pipe leading downwardly into the bucket or pot and terminating below the rim thereof, partitions between successive compartments and apertures in the partitions to provide access between compartments, each aperture having its lower edge spaced above the floors of the adjoining compartments so as to provide at the bottom of each compartment a settling chamber for contaminants denser than the liquid and its upper edge spaced below the level of said exposed weir so as to provide at the top of the first and each intermediate compartment a flotation chamber for contaminants less dense than the liquid, the apertures being arranged so that the liquid in passing through said compartments must follow a tortuous path.

5. In a replenishment tank system an entry portion according to claim 4 wherein said submerged weir in the first compartment is provided by the entire upper edge of a section of tubing, vertically disposed and closed at its lower end, having an entry pipe for the liquid located concentrically therein and terminating short of its lower end.

6. In a replenishment tank system an entry portion according to claim 4 wherein at least said first compartment is provided at its lower end with a purging and draining fitment comprising an outlet orifice and a pivotally dependent weighted obturator formed to have line contact with the internal periphery of the orifice and adapted to be displaced from said contact, for opening the orifice, by being pushed from the exterior of the orifice.

7. In a replenishment tank system an entry portion according to claim 4 having at least one horizontally elongate aperture near the bottom of a partition and an obliquely depending sill immediately above the aperture.

8. In a replenishment tank system an entry portion according to claim 4, wherein the apertures connecting the intermediate compartments are vertically elongate and located on alternately opposite side edge portions of the partitions such that the liquid in passing through the intermediate compartments must follow a horizontally zig-zag path.

9. In a replenishment tank system an entry portion according to claim 8 wherein said second compartment receives the liquid through a said vertically elongate aperture and discharges the liquid over an exposed weir located in a portion of the compartment laterally remote from said aperture.

10. In a replenishment tank system an entry portion according to claim 8 wherein at least said first compartment is provided at its lower end with a purging and draining fitment comprising an outlet orifice and a pivotally dependent weighted obturator formed to have line contact with the internal periphery of the orifice and adapted to be displaced from said contact, for opening the orifice, by being pushed from the exterior of the orifice.

References Cited

UNITED STATES PATENTS

| | | | |
|---|---|---|---|
| 986,897 | 3/1911 | Bowman et al. | 210—533 |
| 1,220,092 | 3/1917 | Gomez | 210—113 |
| 1,893,623 | 1/1933 | Imhoff | 210—195 |
| 2,430,519 | 11/1947 | Mallory. | |
| 2,826,306 | 3/1958 | Burns | 210—533 X |
| 3,260,368 | 7/1966 | Wagner et al. | 210—521 X |
| 3,355,023 | 11/1967 | Foster | 210—256 X |

FOREIGN PATENTS 139,271   5/1934   Austria.

JOHN W. ADEE, Primary Examiner

U.S. Cl. X.R.

210—257, 521, 533